(12) United States Patent
Efthymiou et al.

(10) Patent No.: US 9,944,149 B2
(45) Date of Patent: Apr. 17, 2018

(54) SEAT CONDITIONING HOOD APPARATUS AND METHOD

(71) Applicant: GENTHERM CANADA LTD., Windsor, Ontario (CA)

(72) Inventors: Peter P. Efthymiou, Tecumseh (CA); Paul Stichhaller, LaSalle (CA); Marinko Lazanja, Windsor (CA); Matthew Zuzga, Macomb, MI (US)

(73) Assignee: GENTHERM GMBH, Odelzhausen (DE)

( * ) Notice: Subject to any disclaimer, the term of this patent is extended or adjusted under 35 U.S.C. 154(b) by 332 days.

(21) Appl. No.: 14/620,775

(22) Filed: Feb. 12, 2015

(65) Prior Publication Data

US 2015/0151608 A1 Jun. 4, 2015

Related U.S. Application Data

(62) Division of application No. 12/528,861, filed as application No. PCT/US2008/083077 on Nov. 11, 2008, now Pat. No. 8,979,620.

(60) Provisional application No. 60/990,389, filed on Nov. 27, 2007.

(51) Int. Cl.
*B60H 1/00* (2006.01)
*B60N 2/56* (2006.01)

(52) U.S. Cl.
CPC ..... *B60H 1/00285* (2013.01); *B60H 1/00507* (2013.01); *B60N 2/5621* (2013.01); *Y10T 29/49826* (2015.01)

(58) Field of Classification Search
USPC .......................................................... 454/120
See application file for complete search history.

(56) References Cited

U.S. PATENT DOCUMENTS

| 2,992,604 | A | * | 7/1961 | Trotman | B60N 2/5635 297/180.14 |
|---|---|---|---|---|---|
| 3,671,095 | A | | 6/1972 | Johnson | |
| 4,773,197 | A | | 9/1988 | Sullivan | |
| 5,626,202 | A | * | 5/1997 | Barnes | B60K 11/04 165/121 |
| 6,871,696 | B2 | | 3/2005 | Aoki et al. | |
| 7,607,739 | B2 | * | 10/2009 | Browne | B60N 2/5621 297/180.1 |
| 7,673,935 | B2 | * | 3/2010 | Nishide | B60N 2/5635 297/180.14 |
| 2004/0195870 | A1 | | 10/2004 | Bohlender et al. | |

(Continued)

FOREIGN PATENT DOCUMENTS

JP 05-000623 A 1/1993

OTHER PUBLICATIONS

Search Report & Written Opinion dated Jun. 24, 2009, International Application No. PCT/US2008/083007.

*Primary Examiner* — Nathaniel Herzfeld
(74) *Attorney, Agent, or Firm* — The Dobrusin Law Firm, P.C.

(57) ABSTRACT

A hood article and a method of use for a seat conditioning assembly. The hood article including an air-impermeable housing with an internal hollow chamber and at least a first aperture adapted and a second aperture to connect an air mover to a collar device of an air distribution system assembly. The hood article used for fluidly connecting the air mover to the air distribution system assembly.

18 Claims, 4 Drawing Sheets

(56) References Cited

U.S. PATENT DOCUMENTS

| | | | |
|---|---|---|---|
| 2005/0093347 A1* | 5/2005 | Bajic | B60N 2/5635 297/180.13 |
| 2006/0060344 A1 | 3/2006 | Esaki | |
| 2007/0176471 A1 | 8/2007 | Knoll | |
| 2007/0188007 A1* | 8/2007 | Lazanja | B60N 2/5635 297/452.42 |
| 2007/0200398 A1* | 8/2007 | Wolas | B60N 2/5635 297/180.15 |
| 2007/0262621 A1* | 11/2007 | Dong | A47C 7/72 297/180.12 |
| 2008/0060131 A1 | 3/2008 | Tompkins | |
| 2008/0143152 A1* | 6/2008 | Wolas | B60N 2/5635 297/180.14 |
| 2013/0088064 A1* | 4/2013 | Axakov | B60N 2/5635 297/452.18 |

\* cited by examiner

SEAT CONDITIONING HOOD APPARATUS AND METHOD

CROSS REFERENCE TO RELATED APPLICATIONS

This application is a divisional of U.S. patent application Ser. No. 12/528,861 filed Jul. 21, 2010, which claims the benefit of the filing date of U.S. provisional patent application Ser. No. 60/990,389, filed Nov. 27, 2007, both of which are hereby incorporated by reference in their entirety.

FIELD OF THE INVENTION

The present invention relates to an apparatus and method of use to connect an air mover to a distribution system, more particularly to provide an apparatus and method of use to connect an air mover to an air distribution system in fluid communication with the surface of an automotive seat.

BACKGROUND OF THE INVENTION

It is well known that vehicles are being equipped with a variety of features to enhance the comfort of its occupants, particularly features such as ventilated, heated and/or cooled seats (e.g. seat conditioning systems). These seat conditioning systems can add cost and complexity to the seats and to the assembly of these seats. It is desirous to design a seat conditioning system such that the assembler can install it consistently and easily. Many seat conditioning systems are constructed of multiple components that are assembled or connected when the complete seat is put together (e.g. the air mover and the distribution system). To this end, the present invention seeks to improve on the ease of assembling two main components of a seat conditioning system by the use of a unique hood component.

SUMMARY OF THE INVENTION

The present invention is an improved hood article and method of using the article in connecting an air moving device to a fluid distribution system within an automotive seat.

Accordingly, pursuant to one aspect of the present invention, there is contemplated a hood article for a seat conditioning assembly comprising an air-impermeable housing that may include an internal hollow chamber with at least a first aperture adapted to connect to an air mover and with at least a second aperture adapted to connect to a collar device of an air distribution system assembly; wherein the air mover may be in fluid communication with the air distribution system via the internal hollow chamber.

The invention may be further characterized by one or any combination of the features described herein, such as the at least first aperture may include a plurality of connection devices that allows the hood article to be connected at a plurality of positions radially about the air mover. The least a second aperture that may include at least one hole for receiving a tab on the collar device and at least one snap feature for engaging at least one hole in the collar device. At least a surface adjacent to the first aperture for receiving a sealing material to substantially fluidly seal the interface of the first aperture and the air mover. At least a surface adjacent to the second aperture for receiving a sealing material to substantially fluidly seal the interface of the second aperture and the collar device. The air-impermeable housing may include at least a bottom wall and a top wall interconnected by at least two side walls, a rear wall portion and a front wall portion for defining the internal hollow chamber. The second aperture may be disposed on the bottom wall and the first aperture may be disposed on the front wall portion.

Accordingly, pursuant to another aspect of the present invention, there is contemplated a method of connecting an air mover to an air distribution system assembly with a vehicle seat, that may include the steps of: (a) providing the air mover for communicating air through the vehicle seat, wherein the air mover may be connectively fixed to the seat; (b) providing the air distribution system assembly; wherein the air distribution system assembly may be connectively fixed to the seat and wherein the air distribution system assembly includes a collar device; (c) providing a hood article that may include a first aperture adapted to fluidly connect to the air mover and a second aperture adapted to fluidly connect to the collar device; (d) attaching the hood article to the air mover such that the second aperture may be positioned substantially parallel to the collar device; and (e) attaching the hood article at the second aperture to the collar device.

Pursuant to yet another aspect of the present invention, there is contemplated a hood article for a seat conditioning assembly comprising a rigid air-impermeable housing including a bottom wall defining a first aperture adapted to connect to a suction side of an air mover, and a front wall extending from the bottom wall and defining a second aperture in communication with and angularly oriented relative to the first aperture, the second aperture including a snap feature, wherein the hood article connects the air mover to a flexible air distribution system that is in fluid communication with a surface of an automobile seat, wherein the snap feature engages an opening in the air distribution system and thereby fixes the housing relative to the air distribution system, and wherein the housing communicates air with the air distribution system through the second aperture in a first direction, and communicates air with the air mover through the first aperture in a second direction that is different than the first direction.

Further yet, another aspect of the present invention includes a device for connecting an air mover to an air distribution system that is in fluid communication with a surface of an automobile seat, comprising a rigid air-impermeable housing including a bottom wall defining a first aperture having an attachment feature, a front wall extending from the bottom wall and defining a second aperture in communication with the first aperture via a hollow chamber, the second aperture having two snap features and an engagement opening, wherein at least a portion of the air mover is received in the first aperture to connect the air mover to the housing, wherein each of the two snap features engage corresponding openings in a collar device of the air distribution system and the engagement opening receives a tab on the collar device so that the housing is fixed relative to the air distribution system, and wherein the housing communicates air between the air mover and the air distribution system through the first aperture and the second aperture.

Even further yet, another aspect of the present invention includes a device for connecting an air mover to a flexible air distribution system that is in fluid communication with a surface of an automobile seat, comprising a rigid air-impermeable housing comprising: an upper wall, a bottom wall, opposing the upper wall, defining a generally circular first aperture with a first aperture wall that is generally perpendicular to the bottom wall, the first aperture wall including a plurality of radially disposed notches, a front wall that is generally perpendicular to the bottom wall and extending form the bottom wall and defining a generally oblong second aperture and an internal limiting flange, and a pair of opposing side walls connecting the upper wall and the bottom wall and including: at least one engagement opening, and at least one snap feature extending beyond the front wall, wherein the plurality of radially disposed notches are adapted to fluidly connect the air mover to the housing in a plurality of radial positions at an interface plane located between the bottom wall of the housing and the air mover, wherein the first aperture is adapted to fit over and connect the air mover, wherein the at least one snap feature engages a corresponding opening in a collar device of the air distribution system and the at least one engagement opening receives a tab on the collar device so that the housing is fixed relative to the air distribution system, and wherein the housing communicates air with the air distribution system through the second aperture in a first direction, and communicates air with the air mover through the first aperture in a second direction that is different than the first direction.

DETAILED DESCRIPTION

Figure 1:
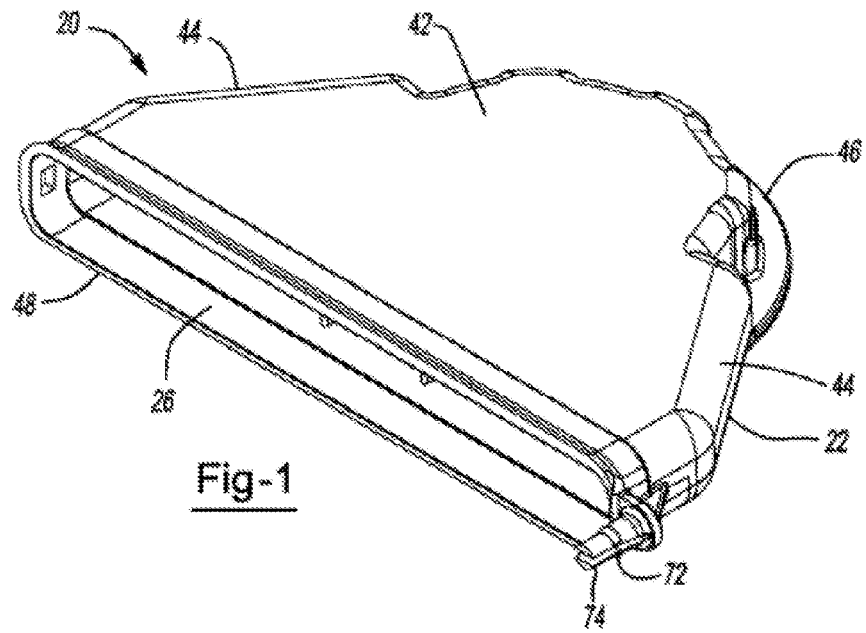
FIG. 1 illustrates a top perspective view of an exemplary hood article per the teachings of the present invention.
Figure 2:
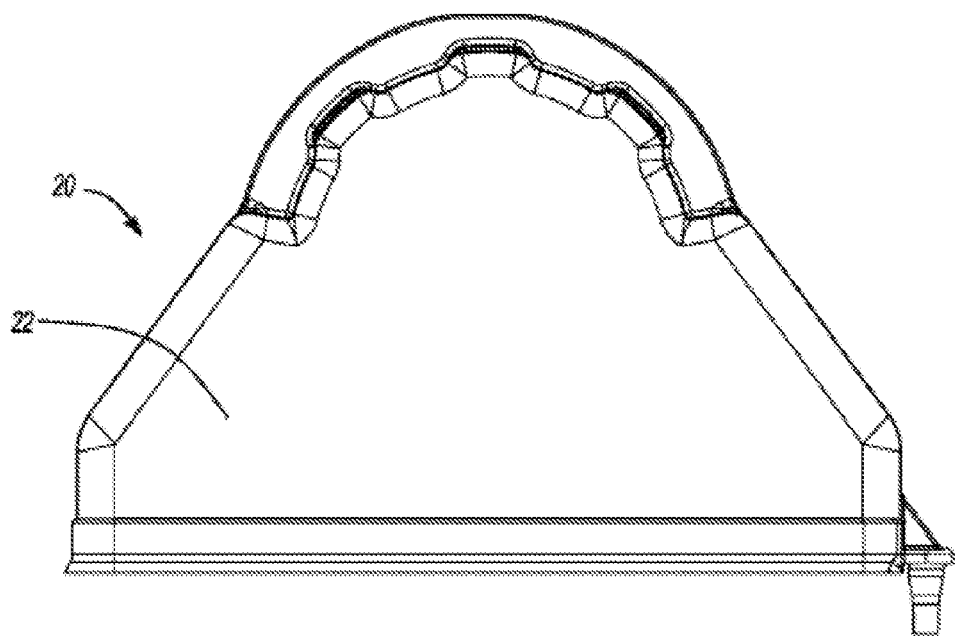
FIG. 2 illustrates a top (plan) view of n exemplary hood article per the teachings of the present invention.
Figure 3:
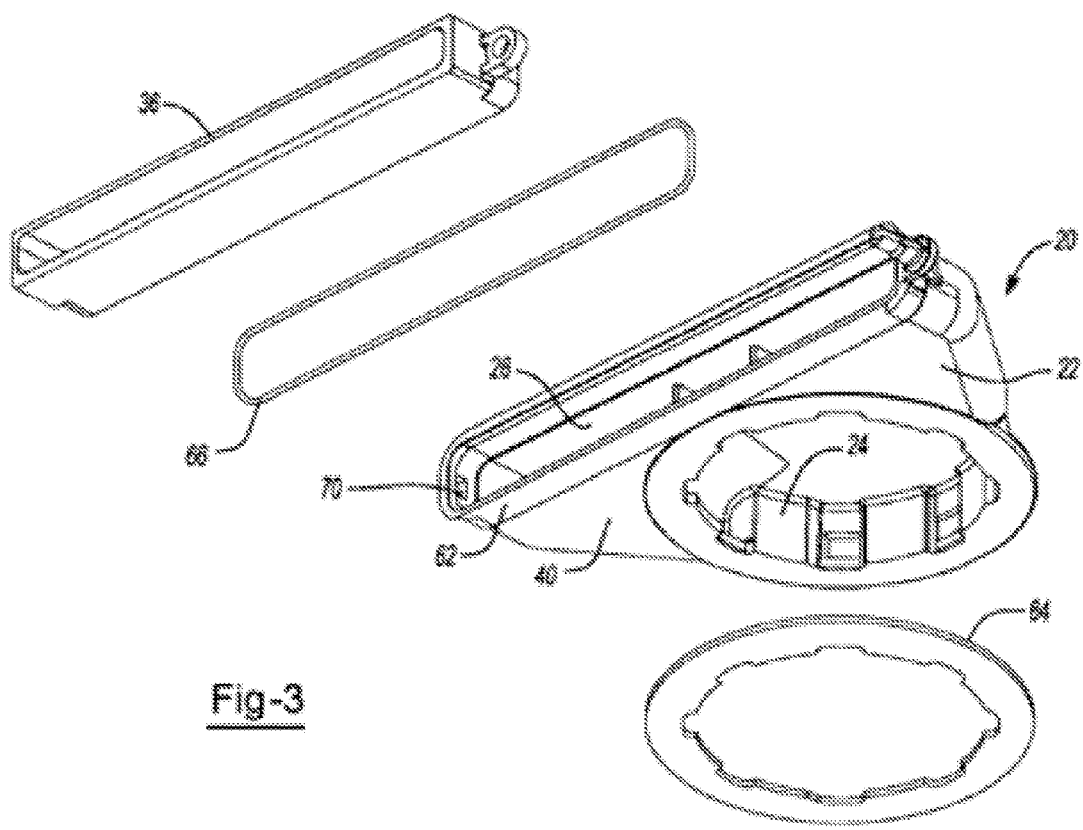
FIG. 3 illustrates an exploded bottom perspective view of an exemplary hood article, with one or more sealing materials and a collar device per the teachings of the present invention.
Figure 4:
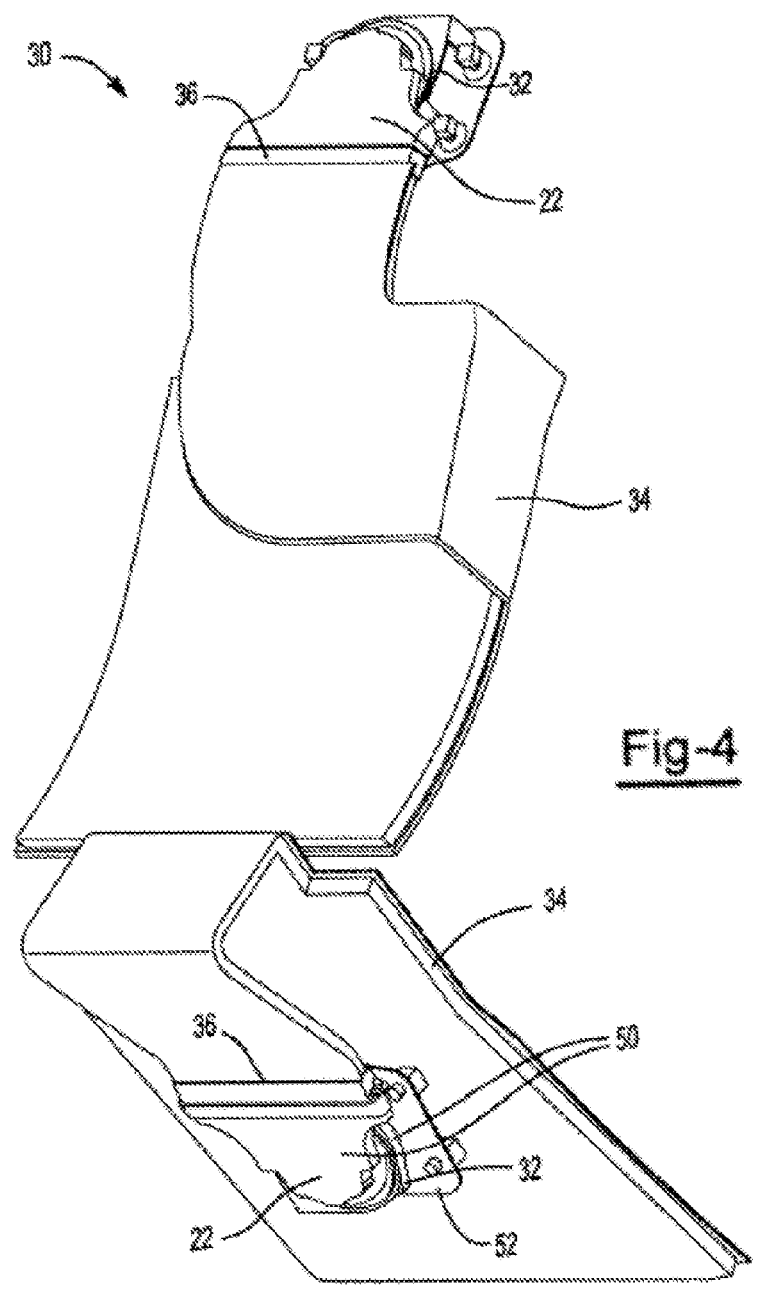
FIG. 4 illustrates a perspective view of exemplary hood articles per the teachings of the present invention installed in an exemplary fluid distribution system for a seat.
Figure 5:
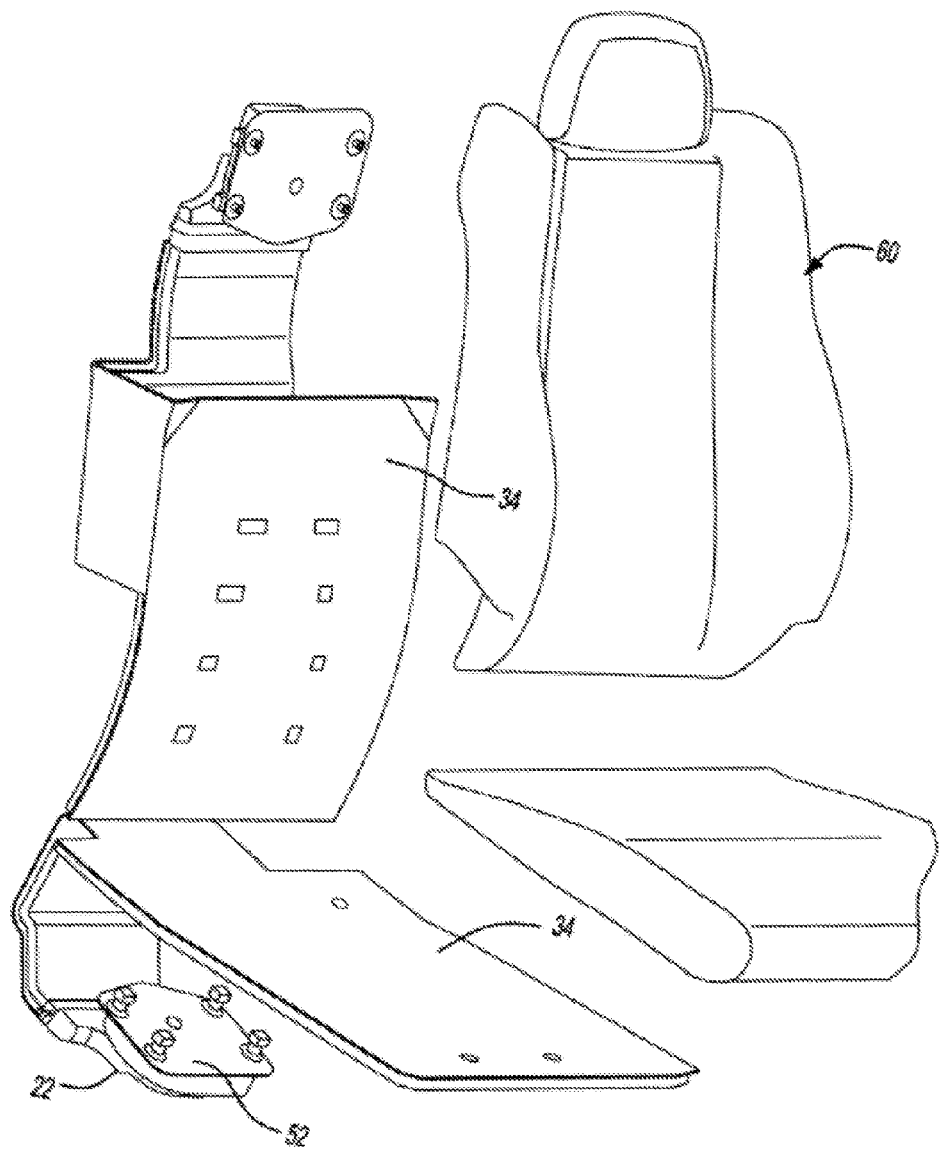
FIG. 5 illustrates an exploded perspective view of an exemplary fluid distribution system and a seat according to the teachings herein.

As illustratively depicted in FIGS. 1-4, the present invention is directed at an improved hood article and method of using the article in connecting an air moving device to a fluid distribution system (e.g. air distribution system assembly 34) within an automotive seat.

In general, the invention contemplates a hood article 20 for use in a conditioning system 30 of a vehicle seat 60. The hood article 20 may be used to connect an air mover 32 of the conditioning system 30 to a collar device 36 on an air distribution system assembly 34 of the conditioning system 30. The hood article 20 is generally a hollow air-impermeable housing 22 with at least a first 24 and second 26 aperture. It is contemplated that the air-impermeable housing 22 may be constructed of a ridged material (e.g. a plastic, metal, or composite material), but may also be constructed of a semi-flexible material (e.g. molded polyurethane). The air-impermeable housing 22 may include at least a bottom wall 40 and a top wall 42 interconnected by at least two side walls 44, a rear wall portion 46 and a front wall portion 48 for defining the internal hollow chamber. The first aperture 24 may be disposed through the bottom wall 40 and the second aperture 26 may be disposed through the front wall portion 48. It is also contemplated that the hood article 20 can be adapted to house and/or secure additional components (e.g. wire harnesses, sensors, switching relays, seat trim, etc . . . ) within the housing and/or through fixation means (e.g. snaps, holes, adhesives). The conditioning system 30 may include an air mover sealing material 64 for fluidly sealing the interface of the first aperture 24 and the air mover 32. The conditioning system 30 may include a collar sealing material 66 for fluidly sealing the interface of the second aperture 26 and the collar device 36. The second aperture 26 may include an internal limiting flange 62. The first aperture 24 and the second aperture 26 are preferably in an angled relationship. For example, the second aperture 26 may be perpendicular to the first aperture 24. The second aperture may 26 include at least one hole 70 for receiving a tab on the collar device and at least one snap 72 feature for engaging at least one hole in the collar device. For example, the snap feature 72 may include a split pin 74.

In a first embodiment, it is contemplated that the first aperture 24 is generally configured to fit over the output area of the air mover so that the fluid from the air mover 32 enters the hood article 20 through this first aperture 24, or alternatively exits it in the case when the air mover is pulling the fluid from the system. In a preferred aspect, the first aperture 24 may have a generally circular shape, but could be any number of shapes (e.g. square, triangular, oblong, elliptical, or the like) and includes a plurality of attachment features (e.g. snap tabs, hook receiving structures, and the like) or even may be a friction fit. The attachment features may be located such that the hood article 20 can be attached at a plurality of locations (radially) to the air mover 32 at an interface plane. In another preferred aspect, there optionally may be a gasket type material disposed between the first aperture 24 and the interface plane to aid in fluidly sealing the connection therebetween. In one preferred embodiment, the hood article 20 and the air mover 32 are combined to form an air mover assembly 50. In this embodiment, the air mover assembly 50 can be attached at a plurality of locations (radially) upon an air mover mounting plate 52.

It is contemplated that the second aperture 26 is generally configured to connectively fit to the collar device 36 which serves as an interface to the air distribution system assembly 34 of the conditioning system 30. In a preferred aspect, the second aperture 26 may have an oblong shape, but could also be any number of shapes, and includes a plurality of attachment features (e.g. snap tabs, hook receiving structures, friction fit, and the like) for attaching to the collar device 36. In another preferred aspect, there optionally may be a gasket type material disposed between the second aperture 26 and the collar device 36 to aid in fluidly sealing the connection therebetween.

In a second embodiment, it is contemplated that there may be a third or more apertures on the hood device for providing fluid communications from the air mover 32 to additional air distribution system assemblies.

In a third embodiment, a method of connecting an air mover 32 to an air distribution system assembly 34 with a vehicle seat is contemplated, which may include the steps of: (a) providing the air mover 32 for communicating air through the vehicle seat, wherein the air mover is connectively fixed to the seat; (b) providing the air distribution system assembly 34; wherein the air distribution system assembly may be connectively fixed to the seat and wherein the air distribution system assembly 34 may include a collar device 36; (c) providing a hood article 20 including a first aperture 24 adapted to fluidly connect to the air mover 32 and a second aperture 26 adapted to fluidly connect to the collar device 36; (d) attaching the hood article 20 to the air mover 32 such that the second aperture 26 is positioned substantially parallel to the collar device 36; and (e) attaching the hood article 20 at the second aperture 26 to the collar device 36.

Unless stated otherwise, the method depicted herein is not intended to be restrictive of the invention, and other dimensions or geometries are possible. In addition, while a feature of the present invention may have been described in the context of only one of the illustrated embodiments, such feature may be combined with one or more other features of other embodiments, for any given application.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A hood article for a seat conditioning assembly comprising:
   a rigid air-impermeable housing including:
      i. a bottom wall defining a first aperture adapted to connect to a suction side of an air mover, the first aperture having a generally circular shape, and
      ii. a front wall extending from the bottom wall and defining a second aperture in communication with and angularly oriented relative to the first aperture, the second aperture having a shape that is different than the generally circular shape of the first aperture,
   wherein the housing comprises a plurality of notches that are defined around an inner diameter of the first aperture, each of the notches extend from the bottom wall towards an opposing top wall, the air mover is adapted to be received into the first aperture and the plurality of notches are adapted to connect the air mover to the housing at a plurality of radial positions,
   wherein the hood article is adapted to connect the air mover to a flexible air distribution system that is in fluid communication with a surface of an automobile seat,
   wherein the housing comprises a snap feature that is arranged adjacent a side of the second aperture, the snap feature projects from the housing beyond a front plane of the second aperture and is adapted to engage an opening in the air distribution system to fix the housing relative to the air distribution system, and
   wherein the housing is adapted to communicate air from the air mover to the air distribution system through the second aperture in a first air flow direction, and is adapted to communicate air from the air distribution system to the air mover through the first aperture in a second air flow direction that is different than the first air flow direction.

2. The hood article of claim 1, wherein the housing includes an engagement opening located within the second aperture, the engagement opening is arranged on a side of the second aperture that opposes the side of the second aperture the snap feature is located, the engagement opening is adapted to receive a tab on the air distribution system.

3. The hood article of claim 2, wherein the engagement opening is a notch that extends partially through a side wall of the housing.

4. The hood article of claim 1, wherein the second aperture is generally perpendicular to the first aperture.

5. The hood article of claim 1, wherein the snap feature is a pin having a split.

6. The hood article of claim 5, wherein the second aperture includes a second snap feature engaging another opening in the air distribution system.

7. The hood article of claim 1, wherein the air from the air mover enters the housing through the first aperture and the housing redirects and communicates the air in the first direction towards the second aperture, and
   wherein when the air mover pulls the air from the air distribution system, the housing redirects and communicates the air in the second direction towards the first aperture so that the air exits the housing through the first aperture.

8. A device for connecting an air mover to an air distribution system that is in fluid communication with a surface of an automobile seat, comprising:
   a rigid air-impermeable housing including:
      i. a bottom wall defining a first aperture having an attachment feature, the first aperture having a generally circular shape
      ii. a front wall extending from the bottom wall and defining a second aperture in communication with the first aperture via a hollow chamber, the second aperture having a shape that is different than the generally circular shape of the first aperture, the second aperture having two snap features and an engagement opening,
   wherein the housing comprises a plurality of notches that are defined around an inner circumference of the first aperture, the notches extend from the bottom wall towards an opposing top wall,
   wherein at least a portion of the air mover is received inside the first aperture, and the plurality of notches are adapted to connect the air mover to the housing at a plurality of radial positions,
   wherein each of the two snap features engage corresponding openings in a collar device of the air distribution system and the engagement opening receives a tab on the collar device so that the housing is fixed relative to the air distribution system,
   wherein the housing communicates air between the air mover and the air distribution system through the first aperture and the second aperture, and
   wherein the housing comprises opposing side walls that extend generally from the first aperture towards the second aperture, the opposing side walls angularly extend away from one another so that the housing has a generally triangular shape.

9. The device of claim 8, wherein the first aperture is generally perpendicular to the second aperture.

10. The device of claim 8, wherein one or both of the snap features are split pins.

11. The device of claim 8, wherein the second aperture includes an internal limiting flange.

12. The device of claim 8, wherein the engagement opening is a notch that extends partially through a side wall of the housing.

13. The device of claim 7, wherein the front wall includes a length that is longer than a length of an opposing rear wall so that the housing has a generally triangular shape.

14. A device for connecting an air mover to a flexible air distribution system that is in fluid communication with a surface of an automobile seat, comprising:
   a rigid air-impermeable housing comprising:
      i. an upper wall,
      ii. a bottom walk opposing the upper wall, the bottom wall defining a generally circular first aperture with a first aperture wall that is generally perpendicular to the bottom wall, the first aperture wall including a plurality of radially disposed notches,
      iii. a front wall that is generally perpendicular to the bottom wall and extending from the bottom wall, and defining a generally oblong second aperture that is wider than a diameter of the first aperture, the front wall also including an internal limiting flange, and iv. a pair of opposing side walls connecting the upper wall and the bottom wall, the opposing side walls extend away from one another so that the housing has a generally triangular shape, the side walls including:

a. at least one engagement opening, and b. at least one snap feature extending beyond the front wall, wherein the plurality of radially disposed notches are adapted to fluidly connect the air mover to the housing in a plurality of radial positions at an interface plane located between the bottom wall of the housing and the air mover, wherein the first aperture is adapted to fit over and connect the air mover, wherein the at least one snap feature engages a corresponding opening in the collar device of the air distribution system to attach the second aperture to the collar device, and the at least one engagement opening receives a tab on the collar device so that the housing is fixed relative to the air distribution system, and wherein the housing communicates air from the air mover to the air distribution system through the second aperture in a first direction, and communicates air from the air distribution system to the air mover through the first aperture in a second direction that is different than the first direction.

15. The device of claim 14, wherein the housing includes a back wall opposing the front wall with a length that is generally shorter than a length of the front wall, wherein the pair opposing side walls angularly extend between the front wall and the back wall so that the housing has a generally triangular shape.

16. The device of claim 13, wherein the pair of opposing side walls includes two snap features which are split pins, wherein one snap feature extends from one wall of the pair of opposing side walls and another snap feature extends from another wall of the pair of opposing side walls, and wherein both snap features extend beyond the front wall of the housing.

17. The device of claim 14, wherein the engagement opening is a notch that extends partially through one wall of the pair of opposing side walls.

18. The hood article of claim 5, wherein a width of the second aperture is larger than a diameter of the first aperture.

* * * * *

UNITED STATES PATENT AND TRADEMARK OFFICE
CERTIFICATE OF CORRECTION

Page 1 of 1

PATENT NO. : 9,944,149 B2
APPLICATION NO. : 14/620775
DATED : April 17, 2018
INVENTOR(S) : Peter P. Efthymiou et al.

It is certified that error appears in the above-identified patent and that said Letters Patent is hereby corrected as shown below:

In the Claims

Column 6, Line 60, Claim 14, delete "bottom walk opposing" and insert --bottom wall opposing--

Signed and Sealed this
Nineteenth Day of June, 2018

Andrei Iancu
*Director of the United States Patent and Trademark Office*